Sept. 24, 1963    W. F. NORRIS    3,105,190
INDUCTION LOGGING SYSTEM UTILIZING SURFACE
RECIPROCAL PRODUCING MEANS
Filed Nov. 30, 1959    6 Sheets-Sheet 2

INVENTOR.
WILLIAM F. NORRIS
BY
Robert K. Schumacher
ATTORNEY

Sept. 24, 1963 W. F. NORRIS 3,105,190
INDUCTION LOGGING SYSTEM UTILIZING SURFACE
RECIPROCAL PRODUCING MEANS
Filed Nov. 30, 1959 6 Sheets-Sheet 3

INVENTOR.
WILLIAM F. NORRIS
BY Robert K. Schumacher
ATTORNEY

United States Patent Office 3,105,190
Patented Sept. 24, 1963

3,105,190
INDUCTION LOGGING SYSTEM UTILIZING SUR-
FACE RECIPROCAL PRODUCING MEANS
William F. Norris, Tulsa, Okla., assignor, by mesne assign-
ments, to Dresser Industries, Inc., Dallas, Tex., a cor-
poration of Delaware
Filed Nov. 30, 1959, Ser. No. 856,291
3 Claims. (Cl. 324—6)

This invention relates to logging systems for determining the lithology of formations surrounding a bore hole, and more particularly to induction logging systems having this as their object.

In the early years of oil well logging the principal apparatus for obtaining information on subsurface lithology employed a plurality of current and pick-up electrodes variously arranged to provide the so-called normal and lateral curves. Somewhat later, transmitting and receiving coil systems were introduced to provide the first induction logs of subsurface lithology. Examples of these latter types of systems are found in Patent 2,220,070 issued to C. B. Aiken on November 5, 1940, and Patent 2,220,788 issued to R. W. Lohman on November 5, 1940. The systems disclosed in these early applications of coil systems to the detection of subsurface lithology employed one or more transmitting coils which were used to establish an alternating field in the subsurface formation and one or more receiving coils disposed in appropriate relation to the transmitting coils to detect the fields as influenced by the formations therebetween.

Sometime after the electrode and induction-type electrical logging systems had been introduced to the oil industry, there was developed the so-called focus log system wherein an alternating field was established between a center current electrode and a remote ground with a pair of elongated guard electrodes disposed above and below the center electrode to focus the current into the subsurface formation. One advantage of this system was that it permitted sharper bed definition and more accurate resistivities to be obtained. More recently, focused induction log systems, as exemplified by Patents 2,582,314 and 2,582,315 issued to H. G. Doll on January 15, 1952, have been introduced. These patents disclose systems relating to the use of a plurality of two-coil systems for the purpose of improving the selectivity and accuracy of the older induction logging systems. Actually, these are not so much systems to focus the transmitting coil field into the formation but systems designed to employ different sensitivity systems to desensitize the receiver to the formation immediately adjacent the bore hole—and hence not representative of the actual subsurface resistivity or conductivity—and to block the effect of formations within a selected ltaeral distance into the formation. By proper selection of coil turns, coil areas and vertical spacings between the coils a system can be fashioned to sample the formation at a point laterally displaced from the bore hole by a preselected amount.

Cooperating with such focused induction logging systems have been various alternating current bridge networks, see, e.g., Patents 2,753,520 and 2,788,483 issued to H. G. Doll on July 3, 1956, and April 9, 1957, respectively. These particular inventions relate to balanced or closed systems wherein the reactive, out-of-phase components of the detected signals—as opposed to the in-phase components which are correlatable with the formations' conductivity—are automatically and continuously eliminated or neutralized by the injection of an oppositely phased signal into the receiver system. The reference for these oppositely phased compensatory signals is obtained from the transmitter coil system and permits the in-phase or resistive component to provide lithological information on the subsurface formations.

These prior-art systems place the present induction logging system, which is a focused induction logging system of the type broadly described in the Patents 2,582,314 and 2,582,315, in perspective. While, broadly, the present system can be so identified, it incorporates a number of features which constitute improvements over the prior-art systems, particularly with respect to tuning the transmitter coil circuit, the mode of sampling to obtain a reference input for the phase sensitive detector, the elimination of any residual mutually induced voltages between the coils, the reciprocating means used to obtain resistivity values, and the technique for setting and detecting different sensitivity settings in the subsurface tool.

As noted above, prior-art systems usually sample the transmitting coil circuit to obtain a reference for their received signals. While this provides a satisfactory enough reference in some ways, it limits the overall system in others. The present invention obviates the shortcomings inherent in sampling across a circuit component serially connected with the transmitter coil by obtaining a reference voltage from the receiver coil system. Reference signals are employed in substantially all induction logging systems to separate the in-phase and out-of-phase components of the detected signal. The term "in-phase" refers to that component of the total detected voltage that is in phase with the current in the transmitter coil. It is the in-phase component of the total signal voltage that is related to formation conductivity. The term "out-of-phase" refers to that component of the total detected voltage that is in quadrature with the current in the transmitter coil. The "out-of-phase" or quadrature component of the total detected voltage is related to the magnetic susceptibility of the formation. Most important of the advanages accruing from this change in sampling is that the reference voltage undergoes the same phase shift as the signal, the phase shift being due to changes in the receiver coils due to temperature changes. The tuned transmitter coil permits the output level and response of the system to be increased substantially since response is proportional to the current times the frequency squared. The highest frequency which can be used in an induction system is limited by the skin effect. Beyond 20 kc., the skin effect becomes oppressive. Thus, the most important improvements in the overall system can be obtained by increasing the level of current flowing from the transmitting coil. By incorporating the transmitting coil into a high Q circuit it substantially increases this level.

In a properly designed circuit, the receiver coil system can be used to reference the phase sensitive detector for the resolution of the complex signal input.

Turning to another point of difference and improvement in the present system, it is known that the proper balancing of a multiple coil system, with respect to the number and polarity of turns and their relative distances apart will act to eliminate any mutual inductance between the coils in the system. This knowledge is behind the multiple coil induction logging systems which employ coils variously oriented to cancel out the mutual which degrade the lithological information signal. Even so, in practice the mutual of a coil system is never equal to exactly zero and, to the extent that it is not, it degrades the signal obtained. In the present system, the serially connected receiver coil sytsem cooperates with a balancing network which cancels out the residual mutual between the coils so that the conductivity ultimately obtained is not marred by the presence thereof.

Another improvement incorporated into the present system is the technique of converting the received signal to a servo shaft rotative position to obtain both the conductivity and the resistivity of the subsurface formation adjacent the coil system. Most induction logging systems provide conductivity and resistivity information for the ultimate customer. As a practical matter, the oil industry is more interested in the resistivity than the conductivity, but since an induction logging system measures conductivity, it is necessary in some manner, to reciprocate the conductivity signal to obtain the comparable resistivity one. In most prior-art systems this is obtained by directly measuring the conductivity and then reciprocating it by electronic means. One of the disadvantages of the prior-art pattern is that often the electronic system drifts or otherwise departs from an exact reciprocal relation. Hence the anomolous situation occurs where the conductivity is not the reciprocal of the resistivity and vice versa. At this point, a user of a log does not know whether one or both of the recorded signals is in error.

The present invention overcomes this problem by feeding the detected signal into a reciprocal circuit including a position-type servo system. The servo system employs a plurality of linear potentiometers driven by the servo motor and the reciprocal circuit translates the detected signal into a shaft position which in turn cooperates with certain ones of the linear potentiometers to provide the resistivity and conductivity measurements. Cooperating with the servo system is a feedback potentiometer which returns the servo error signal to zero when the shaft position corresponds to the input signal. This method of obtaining the resistivity and conductivity provides a straightforward way to insure that the values are direct reciprocals of each other.

Another improvement in the present system over the prior-art logging system is the means by which the subsurface sensitivity switches are changed and their instant settings identified at the surface equipment. Beyond this, certain improvements reside in the means for regulating the transmitter power supply to obtain a constant voltage output for the transmitting coil, and the various circuits used to reduce the inner conductor capacitance and leakage of the coil system. In connection with the latter, a group of Faraday shields cooperate with the coil system to help provide the necessary stability for satisfactory operation.

From the foregoing it can be seen that the object of the present invention is to provide an improved focused induction logging system which is more accurate, simpler to construct, and more economical to maintain. These objects are largely obtained in the present invention by the application of the improvements noted above.

A feature of the invention pertains to the use of the transmitting coil in a tuned circuit in order to improve the signal level of the coil system. An ancillary part of this feature pertains to the use of the receiver coil system to provide the reference sample for the phase-sensitive detector to permit stable operation at higher temperatures.

Yet another feature of the present invention pertains to the use of a balancing network to eliminate the residual mutual of the coil system by resolving the amplitude and phase thereof.

Other features of the invention relate to the improved transmitter power supply and mode of regulation thereof, the reciprocating means employed to obtain the resistivity and conductivity signals, and the method for setting subsurface sensitivity and operate positions from the surface equipment.

These and other objects and features will be more fully understood when the following detailed description is read with reference to the drawings, in which.

Figure 1:
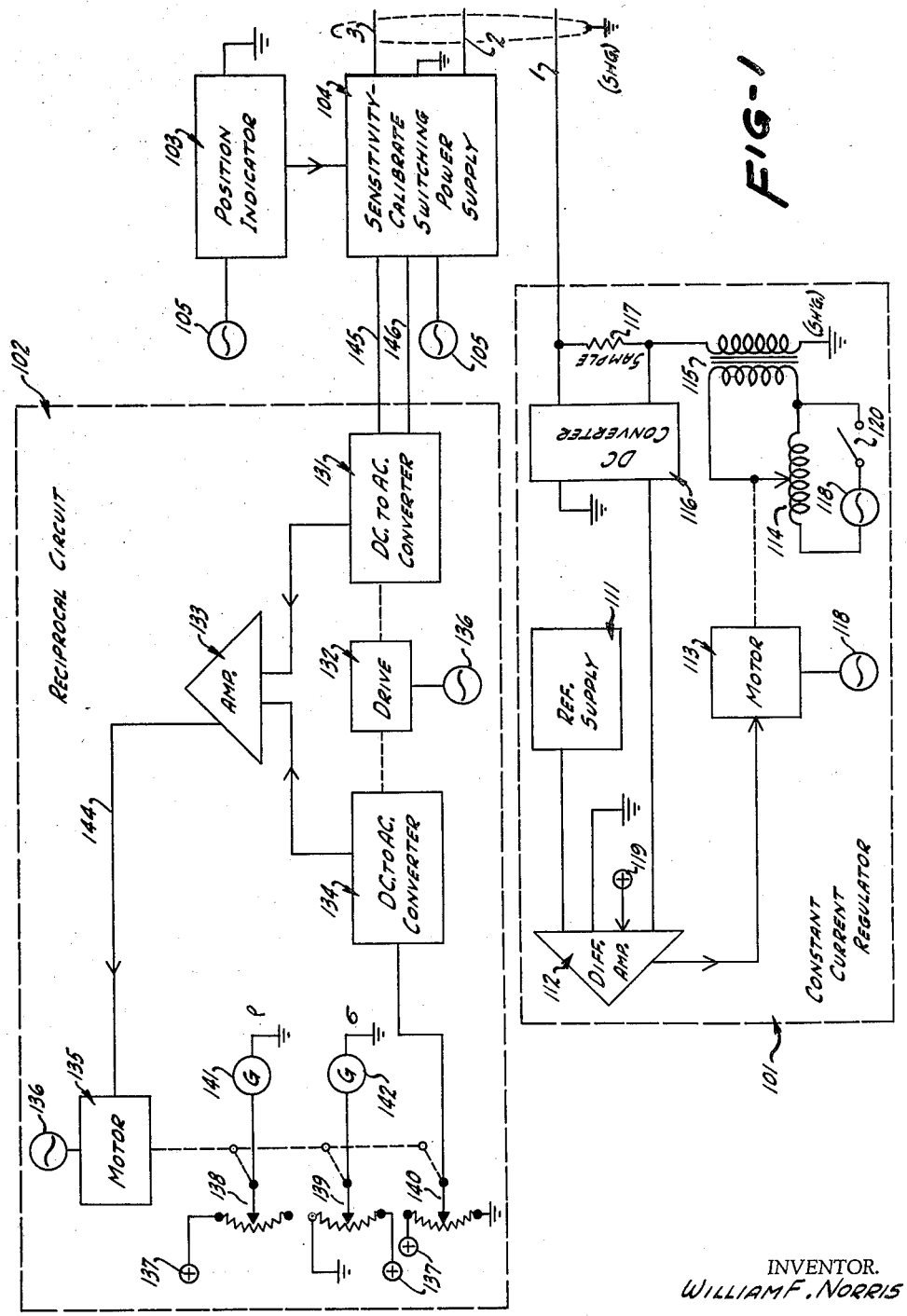
FIG. 1 is a functional block diagram of the surface equipment of the present induction logging system.
Figure 2:
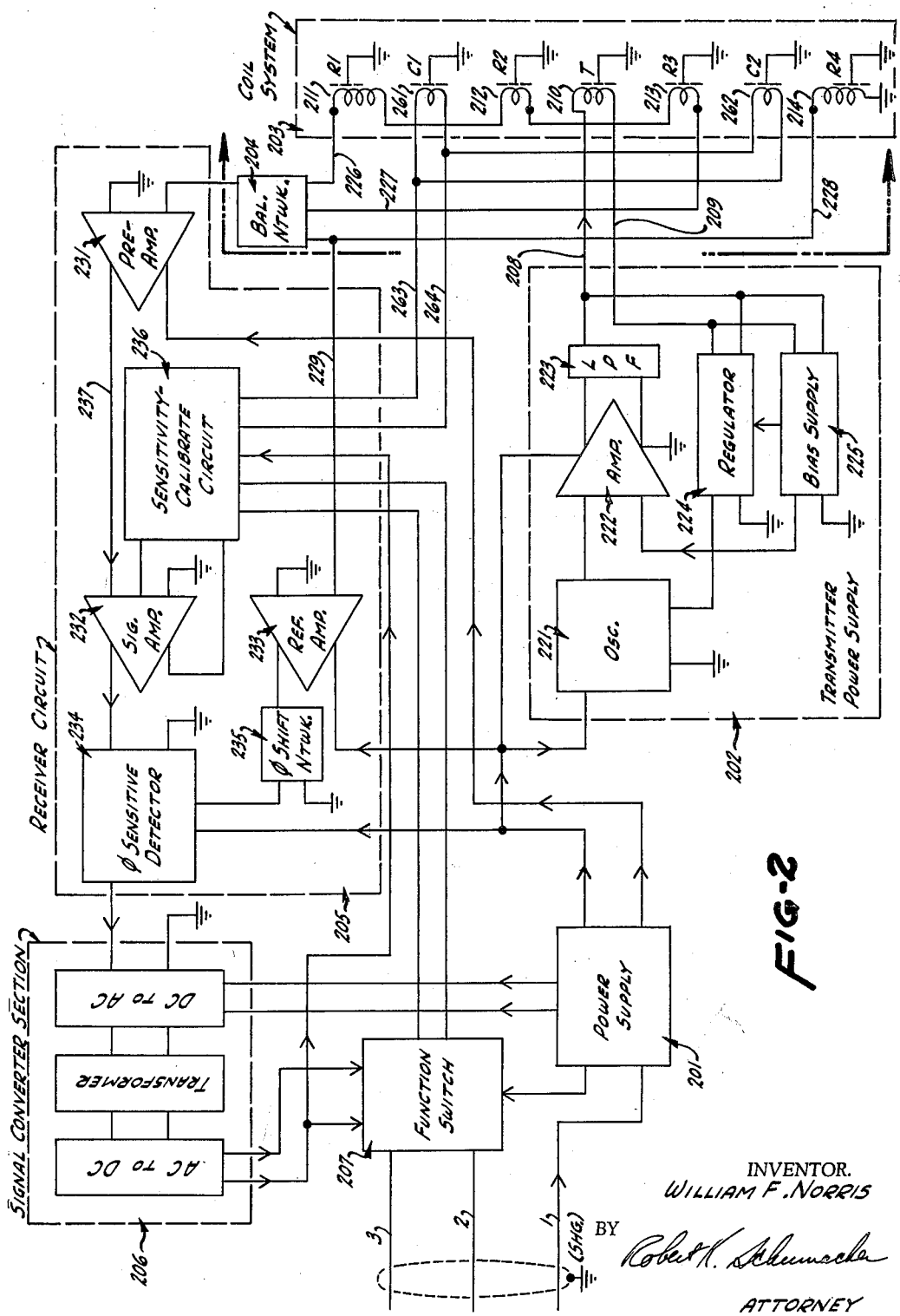
FIG. 2 is a functional block diagram of the subsurface equipment of the present induction logging system.
Figure 4:
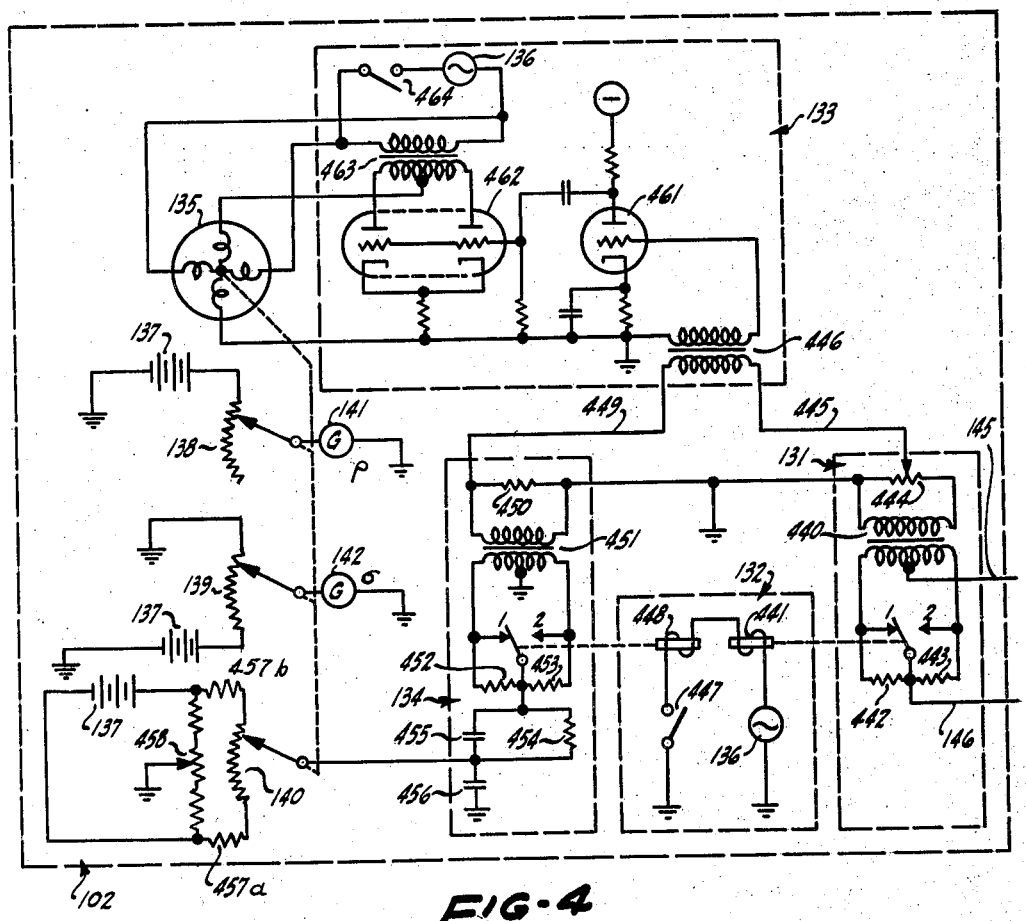
Figure 8:
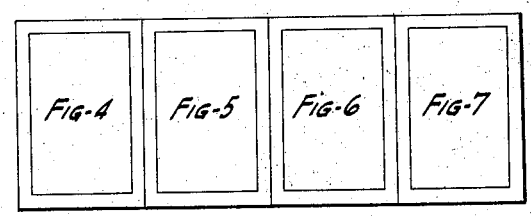
Figure 3:
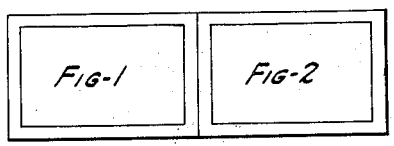
FIG. 3 illustrates the relationship of FIGS. 1 and 2 to functionally represent an induction logging system in accordance with the present invention.
Figure 5:
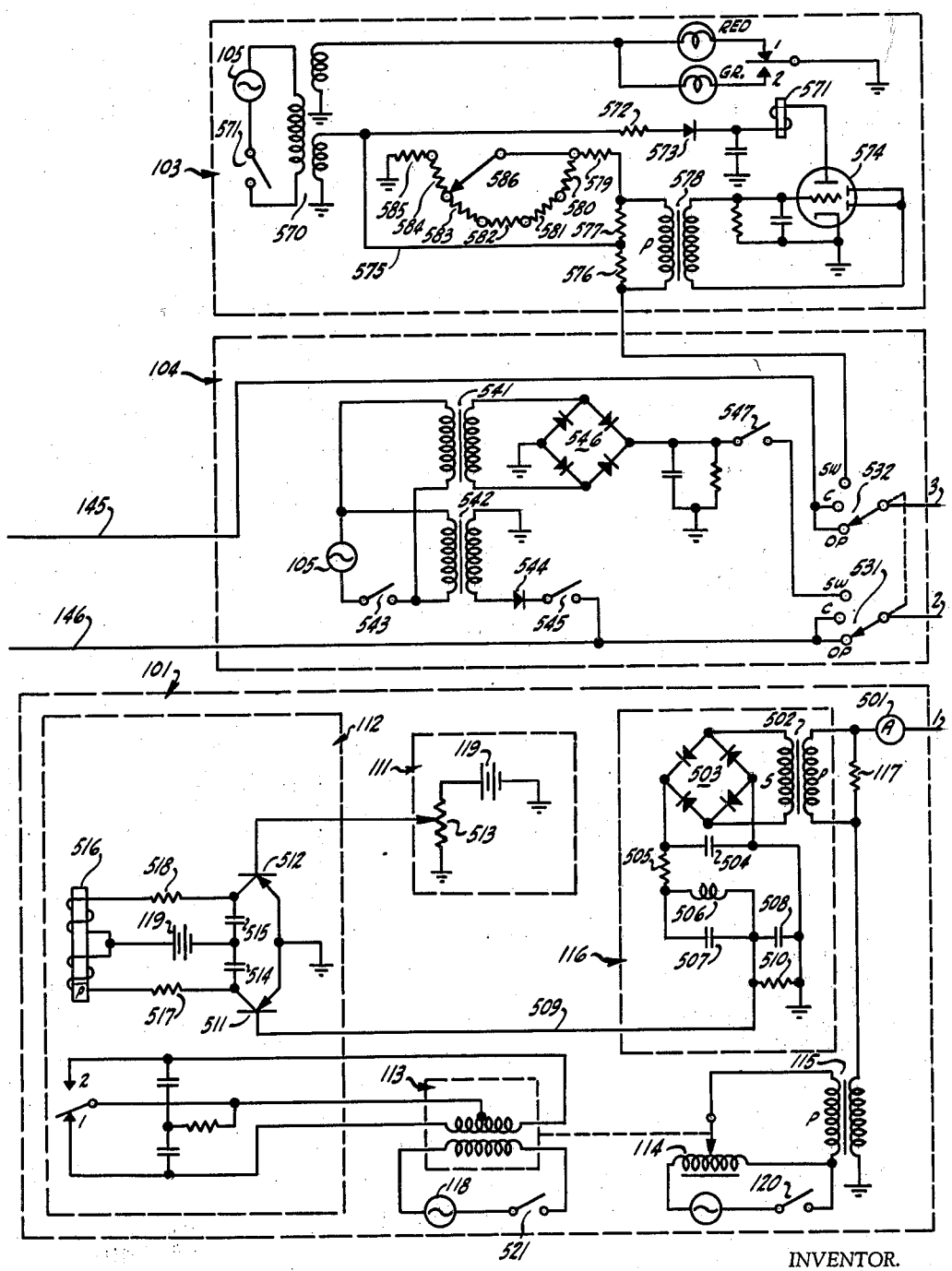
Figure 6:
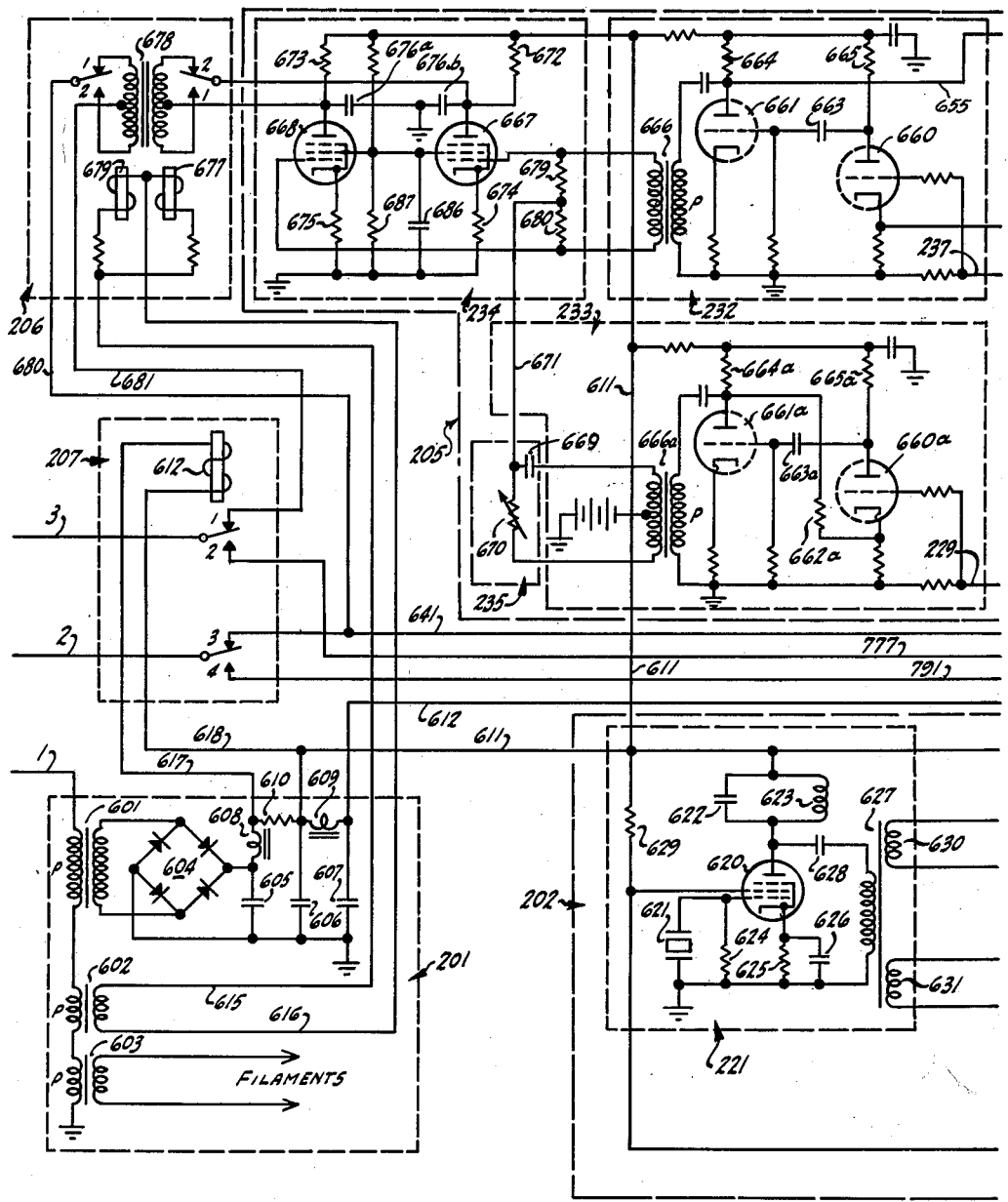

FIGS. 4, 5, 6 and 7 constitute a detailed schematic of the induction logging system functionally illustrated in FIGS. 1 and 2; and FIG. 8 illustrates the relationship of FIGS. 4, 5, 6 and 7 to form the induction logging system exemplified in FIGS. 1 and 2.

GENERAL DESCRIPTION

The induction logging system constituting the present invention is functionally illustrated in FIGS. 1 and 2 of the accompanying drawings. The surface equipment of the system is illustrated functionally in FIG. 1 and the subsurface equipment functionally in FIG. 2. Looking first to FIG. 1, the surface equipment may be seen to include a constant current regulator 101, a reciprocal circuit 102, a position indicator 103, a sensitivity-calibrate switching power supply 104, and sources of alternating current 105. These circuits cooperate with the subsurface equipment by way of the shielded cable including conductors 1, 2 and 3.

The subsurface equipment or logging tool may be seen to include a power supply 201, the transmitter power supply 202, a coil system 203, a balancing network 204, a receiver circuit 205, a signal converter section 206, and a function switch 207.

Broadly speaking, the induction logging system functionally disclosed in FIGS. 1 and 2 operates as follows: A constant current is generated by the constant-current regulator 101 and fed between conductor 1 and sheath ground to the subsurface power supply 201 which in turn supplies filament power and a source of constant B+ to the various subsurface electronic components. One of these components is the transmitter power supply 202, which acts to generate effectively a constant voltage of a preselected frequency (20 kc.) for application to the transmitting coil 210 of the coil system 203. The constant intensity field established by the transmitting coil 210 in the formation surrounding the subsurface tool in conjunction with the formations establishes a secondary field. It is this secondary field which is sampled by receiving coils 211, 212, 213 and 214 to provide an indication of the formation conductivity.

Serially connected receiving coils 211—213 feed the detected signal through the balancing network 204, which acts to eliminate any residual mutually-induced voltage between the coils, to the receiver circuit 205. In the receiver circuit 205 the signals, as detected by coils 211—213 and by reference coil 214, are amplified and combined to provide an output which is the in-phase component of the detected signal; that is to say, the part of the detected signal which is correlatable with the conductivity of the formation adjacent the coil system. This in-phase component is fed to the signal converter section 206 which converts, amplifies, and thereafter rectifies the signal preparatory to its being placed across conductors 2 and 3 for transmission to the surface equipment previously indicated.

The output from the signal converter section 206 is applied through the function switch 207 which, in its normal operating position, permits the detected in-phase signal to be placed across conductors 2 and 3 for transmission to the sensitivity-calibrate switching power supply 104 of the surface equipment (FIG. 1).

At the surface the signal flowing in conductors 2 and 3 is directed into the reciprocal computer circuit or reciprocator 102. The reciprocal computer circuit 102 converts the detected signal into an equivalent shaft rotation of a position indicating servo system in order to provide a direct reading of the formation conductivity adjacent the coil system and a reciprocal indication, i.e., the resistivity of the formation.

While this broadly describes the operation of the system, it is well to note that the position indicator 103 and sensitivity-calibrate power supply 104 are operable at the surface to provide function switching signals over conductor 2 and to receive indications over conductor 3, through the function switch 207, to part of the receiver circuit 205 which selects sensitivity and calibration values.

The functional operation of the present induction logging system may be understood in more detail by the functional sub-blocks indicated in the FIGS. 1 and 2, as will be more clearly understood from the following description. Turning first to the constant-current regulator 101 which supplies a constant current to the subsurface equipment over conductor 1 and sheath ground, it can be seen to include a reference supply 111, a differential amplifier 112, a motor 113, a "Variac" 114 driven by the motor 113, a transformer 115, a D.-C. converter 116, a sample resistor 117, a source of alternating current 118, a source of B+ voltage 119, and a manually operable switch 120. With the switch 120 closed, the source of A.-C. power 118 is applied through the Variac 114 to the primary of transformer 115. Since the secondary of transformer 115 is connected between ground and one side of the sample resistor 117 and the other side of resistor 117 is connected to conductor 1, the particular setting of the Variac 114 determines the amount of current flowing through the secondary of transformer 115 and the resistor 117 into conductor 1. With a given level of current flowing through conductor 1 to the subsurface equipment, the resistor 117 is used to detect this current. The sample is applied to the input of the D.-C. converter 116 which converts the alternating current to an equivalent D.-C. voltage which is applied to one side of differential amplifier 112. The other input to the differential amplifier 112 is from reference supply 111. Prior to the operation of the circuit, the reference supply 111 is set at a desired value to form a constant or reference input to the differential amplifier 112. With this reference supplied, the equivalent D.-C. voltage determined by the current flowing through resistor 117, if the two inputs are not equal, produces an output which acts to cause the shaft of the motor 113 to rotate which, in turn, controls the particular setting of the "Variac" 114. As long as the input to the differential amplifier 112 is not zero, the amplifier continues to provide a driving input for the motor 113 which changes the pick-off point of the "Variac" 114.

If the load represented by conductors and subsurface instrumentation increases, which causes the current flowing over conductor 1 to tend to decrease, the differential input to the amplifier 112 drives the motor whereby a higher percentage of the alternating current source 118 is applied to the primary of transformer 115 for transmission through conductor 1. On the other hand, if the load tends to decrease thereby causing the current flowing in conductor 1 to tend to increase, the differential input to the amplifier 112 is of opposite polarity and drives the motor 113 in an opposite direction to decrease the current flowing in the primary of transformer 115, and hence, the current ultimately flowing in conductor 1.

With a preselected constant current flowing through conductor 1 to sheath ground, the subsurface power supply 201, which is conventional in construction, provides a source of constant direct current or B+ for the transmitter power supply 202, the receiver circuit 205, and the function switch 207. Beyond this, the power supply 201 provides a source of filament power for vacuum tubes associated with the subsurface electronic components (which filaments are not indicated in the drawings) and an alternating current to the signal converter section 206, the latter acting as a synchronous converter-rectifier or chopper, as will be explained more fully below.

The transmitter power supply 202 which receives its power from the subsurface power supply 201 includes a crystal oscillator 221, a power amplifier 222, a low-pass constant-K filter 223, a regulator circuit 224, and a bias supply 225. Oscillator 221 is a crystal controlled oscillator which provides a low-level signal of accurately controlled frequency that is fed into the class B operated, push-pull amplifier 222. The output of power amplifier 222 is fed through the low-pass filter 223, which transforms the essentially constant-current input thereto into substantially a constant voltage output, to the transmitter coil 210. A portion of the output from low-pass filter 223 is sampled and fed to the regulator 24 and the bias supply 225. The regulator circuit 224 takes this alternating signal and converts it to direct current for application through a regulator tube to the oscillator 221 in order to control the amplitude of the output signal supplied to the transmitter coil 210. On the other hand, the bias supply 225 samples the output signal, and rectifies and filters it to provide the necessary bias for the regulator circuit 224 as well as the high fixed bias required by the amplifier 222. This particular technique for obtaining the bias represents a substantial simplification of circuitry and eliminates the need for a much more complex subsurface power supply 201. At the same time, the sample of the output is too small to significantly affect the output voltage supplied across the transmitter coil to establish a field in the formation adjacent the logging tool.

In the particular coil system illustrated in FIG. 2, the receiver coils 211—213 are serially connected and fed over leads 226 and 227 to the input of the balancing network 204. Another input to the balancing network 204 is provided via lead 228 from receiver coil 214, the other side of which is connected to ground. As noted before, the balancing network 204 acts to cancel out the residual mutual (quadrature component) between the coils in the coil system 203, both as to amplitude and phase so that the input to the receiver circuit 205 represents the influence of the formation on the established field rather than, in part, the residual mutual inductance of the coil system. The input to the balancing network from the reference receiver coil 214 is connected over lead 229 to another input to the receiver circuit 205 and provides a reference for the detected signal.

It might be well to remember that, theoretically, the balancing network 204 is not needed since the polarity of the coils, their vertical spacing from one another, and the number of turns in each have been selected so that the mutual inductance between the coils in the system should be equal to zero. However, as is well known, there is no way to design a coil system to provide precisely a zero mutual inductance. As a consequence, means must be provided for balancing out the residual mutual in order to provide the theoretically promised zero mutual induction.

The output from the balancing network 204 and the reference receiver coil 214 are fed to the receiver circuit 205 which includes a preamplifier 231, a signal amplifier 232, a reference amplifier 233, a phase-sensitive detector 234, a phase-shift network 235, and a sensitivity-calibrate circuit 236. The output from the balancing network 204 is fed to the input of preamplifier 231 which utilizes a cathode follower output to produce a broadband amplifier less sensitive to phase shift. The low impedance output from the preamplifier 231, which basically acts as simply a voltage amplifier, is fed over conductor 237 to the input of the signal amplifier 232. The signal amplifier 232 is an RC coupled voltage amplifier which amplifies the detected signal and feeds it to one input of the phase-sensitive detector 234. The other input to the phase-sensitive detector 234 comes from the reference amplifier 233 and the phase-shift network 235.

The detected signal from coil 214 is fed over leads 228 and 229 to the input of the reference amplifier 233, which is similar to the signal amplifier 232. In fact, it is an RC coupled voltage amplifier of substantially identical construction and, both are transformer coupled at their outputs to the phase-sensitive detector 234. The phase-shift network 235 through which the output of reference amplifier 233 is applied to the phase-sensitive detector 234 acts to shift the phase of the signal detected by the receiver coil 214 approximately 90 degrees in order to put it in phase with the current flowing in the transmitter coil 210.

The phase-sensitive detector 234 provides an output proportional to the in-phase component of the signal voltage. The detector 234 takes the sum and difference of the signal and reference voltages, integrates them, and provides an output proportional to the signal voltage. Actually, the particular circuit is arranged so that the output is a rectified or D.-C. signal fed to the converter section 206 which converts the rectified signal to alternating current so that it may be stepped up and reconverted to direct current for transmission to the surface recording equipment. This output of the phase detector 234 is the in-phase component of the signal input, thus the detector 234 acts to eliminate the out-of-phase component from the signal supplied thereto. The signal converter section 206 is employed to lower the impedance of the signal for transmission to the surface equipment over conductors 2 and 3.

With the system in its "operate" condition, the function switch 207 permits the output from the signal converter section 206 to be applied directly to conductors 2 and 3 for transmission to the surface equipment. Since the sensitivity-calibrate switching power supply 104 is out of the circuit in the operate condition, the in-phase signal on conductors 2 and 3 is fed to the input of the reciprocal circuit 102. The reciprocal circuit 102 includes a D.-C. to A.-C. converter 131, a drive mechanism 132, a differential amplifier 133, a second D.-C. to A.-C. converter 134, a motor 135, a source of alternating power 136, a source of B+ potential 137, three linear potentiometers 138—140 driven by the shaft of the motor 135, and galvanometers 141 and 142 associated with the conductivity and resistivity recording devices, respectively.

The output from the sensitivity-calibrate switching power supply 104 is fed over leads 145 and 146 to the D.-C. to A.-C. converter 131 in the reciprocal circuit 102. Converter 131 synchronously converts the incoming signal responsive to the drive member 132, in turn driven by the alternating source 136. The output from the converter 131 constitutes one input to the differential amplifier 133. Whenever there is a differential input to the amplifier 133, and ignoring for the minute where the other input to the amplifier 133 is developed, it causes the motor 135 to rotate which is turn positions the wipers on potentiometers 138, 139 and 140, which wipers are ganged to the shaft of the motor 135. The potentiometer 138 is arranged to be current sensitive, thus the current flowing from the source of positive potential 137 through the potentiometer 138 causes the galvanometer 141 to record a value proportional to the resistivity of the formation adjacent the coil system. On the other hand, the potentiometer 139 is arranged to be voltage sensitive, therefore, the amount of voltage divided off by its wiper from the source of D.-C. potential 137 is directly proportional to the conductivity of the formation adjacent the coil system. The conductivity is recorded on galvanometer 142.

The third potentiometer 140 provides a feedback voltage for the amplifier 133. The voltage detected by the wiper of the potentiometer 140 is fed to the input of the D.-C. to A.-C. converter 134 which rectifies it and applies it to the other input of the amplifier 133. Here again, the conversion occurs synchronously due to the driver 132 operating synchronously with respect to the source of alternating power 136. As long as the difference in inputs to the amplifier 133 is zero, the motor is stationary. But, whenever the input to the converter 131 causes a differential input, the output of amplifier 133 is fed over lead 144 to the input of the motor 135 with the result that the shaft rotates the potentiometers 138—140 to reduce the differential input to amplifier 133 to zero. The particular arrangement of the conductivity and resistivity circuits in the present reciprocal circuit 102 constitutes a substantial improvement over prior-art techniques wherein it is ordinarily necessary to employ nonlinear potentiometers to reciprocate the current or voltage to attain the resistivity, or alternately, the conductivity. By floating the potentiometer 138 the wiper thereof picks off the current flowing through the effective part of the potentiometer and hence provides a direct measurement of conductivity. In the same manner, by connecting the potentiometer 139 between ground and a source of positive potential 137, its wiper picks off the reciprocal of the current flowing or the resistivity of the formation adjacent the coil system. The third potentiometer 140, as noted above, provides the feedback voltage to return the amplifier 133 to a zero differential input condition after a particular change in subsurface lithology has been detected.

Prior to beginning operation of the induction logging system as herein disclosed, it is necessary to calibrate the instrument and select the particular sensitivity desired. This is done by the cooperation of the position indicator 103, the sensitivity-calibrate switching power supply 104, and the subsurface sensitivity-calibrate circuit 236. These cooperate by way of conductors 2 and 3 and the function switch 207 in the subsurface tool to provide the necessary switching and indications.

The sensitivity-calibrate switching power supply 104 provides a source of D.-C. voltage to operate switches in the subsurface sensitivity-calibrate circuit 236. At the same time, the position indicator 103 cooperates with the sensitivity-calibrate switching power supply and the conductors 2 and 3 to provide a means for setting and detecting a given sensitivity setting. By manually setting the position indicator 103 to a desired sensitivity position and thereafter energizing the sensitivity-switch in circuit 236, the comparable sensitivity can be set in the subsurface tool and an indication provided at the surface.

The other function of the sensitivity-calibrate switching power supply 104, upon the manual operation of a calibrate switch, is to place a resistive load across the calibrate coils 261 and 262. The load is the correct one for the desired sensitivity. By calibrating in this manner the losses, gains, phase shifts, etc., from the input to the output of the entire induction logging system can be taken into account and the galvanometers preset to provide accurate indications when actual logging operations are undertaken. These particular circuits and their cooperation with the surface and subsurface instruments to provide proper stepping of the subsurface sensitivity circuit 236 as well as to place unique calibrate resistors across the calibrate coils 261 and 262 will be explained in more detail in the following detailed description. Suffice it here to say that these circuits provide the surface means for selecting a desired sensitivity and calibrate dummy load consistent therewith.

DETAILED DESCRIPTION

Now that the overall operation of the instant induction logging system has been explained in connection with FIGS. 1 and 2, it is pertinent to consider the detailed circuit as described in FIGS. 4–7. In order to fit the detailed description in to the functional block diagrams of FIGS. 1 and 2, each of the blocks will be described in turn and related to the functional workings of the system as broadly disclosed and desecribed in connection with FIGS. 1 and 2.

The current regulator 101 acts to provide a source of constant current over conductor 1 and sheath ground to the subsurface power supply 201. The 60-cycle alternating current from source 118 is fed off of the "Variac" 114 after the manually operated switch 120 has been closed. The wiper of Variac 114, the position of which is determined by the operation of the motor 113 as will be explained below, picks off a preselected portion of alternating current from source 118 and applies it to the primary winding of transformer 115. The secondary winding of transformer 115 is serially connected between ground and one side of the sample resistor 117, and the other side of resistor 117 is connected through an ammeter 501 to conductor 1. The primary winding of a transformer 502 shunts the sample resistor 117, and the secondary of this transformer is connected to the opposite sides of a bridge rectifier 503. The transformer 502 and the bridge rectifier 503 form part of the A.-C. converter circuit 116 which acts to convert the current flowing through sample resistor 117 into an equivalent D.-C. voltage for application to the differential amplifier 112. The output from the bridge rectifier 503 is fed through a filter and dropping circuit including shunt capacitor 504, resistor 505, inductor 506, capacitors 507 and 508 and resistor 510 to lead 509. The rectified equivalent voltage on lead 509 is applied to the base of a transistor 511 in the differential amplifier 112. Transistor 511 is connected in a common emitter arrangement with reference transistor 512 similarly connected. The base of transistor 512 is connected to the wiper of variable resistor 513 which is connected between ground and battery 119 in the reference supply 111.

With a preselected reference bias placed on the base of transistor 512, variations in the bias on the base of transistor 511 act to operate the differential amplifier 112 and produce an output to control the motor 113. The emitters of transistors 511 and 512 are grounded and their collectors are connected through condensers 514 and 515 to a common point, which in turn is connected to the negative terminal of a battery 119. The positive terminal of battery 119 is commoned to one terminal of each of two windings on polarized relay 516, while the collector of transistor 511 is connected through a dropping resistor 517 to the other terminal of the lower winding and the collector of transistor 512 is connected through a dropping resistor 518 to the other terminal of the upper winding.

With this arrangement, whenever the current through resistor 117 that is sampled, rectified, and applied to the base of the transistor 511 becomes larger than that supplied to the base of the reference transistor 512, transistor 511 permits the current flowing therethrough to increase. As a result, the polarized relay 516 operates to its contact 1 responsive to current flow in the lower winding. On the other hand, when the current flowing through sample resistor 117 decreases, the signal transistor 511 is driven toward cut-off, which decreases the current flowing therethrough and permits the reference transistor 512 to cause the larger current of the two to flow through the upper winding of relay 516 which operates the relay 516 to its other contact 2. The swinger associated with the contacts 1 and 2 and the contacts are connected to a shaded pole motor which is driven in one direction when the current through resistor 117 is high and in the other direction when the current therethrough is low. Rotation of motor 113 changes the effective take-off point of the Variac wiper 114. Whenever the current flowing thorugh sample resistor 117 is too high and the polarized relay 516 operates through its lower winding to contact 1, the motor 113 drives the wiper of the "Variac" 114 to reduce the current flowing from source 118 to the primary of transformer 115. In the other case, where the current flowing through sample resistor 117 is too small, polarized relay 516 operates through its upper winding to contact 2 to cause the motor 113 to rotate the wiper of "Variac" 114 whereby the current output from 118 to the primary of transformer 115 is increased. It can be seen too that manually operable switch 521 is provided for originally applying the source of alternating power 118 to the field winding of the motor 113.

Briefly then, the current flowing between conductor 1 and sheath ground is sampled through resistor 117, rectified, and filtered, and applied over lead 509 to the signal transistor 511 where, cooperating with the reference transistor 512, it acts to operate the polarized relay 516 to its contact 1 or 2 depending upon whether the motor 113 should increase or decrease the current flow through transformer 115 and over conductor 1.

*Subsurface Equipment*

The current flowing over conductor 1 to the subsurface equipment and power supply 201 flows through the primary of transformers 601, 602, and 603. The secondary of transformer 601 is conected to the input terminals of a conventional bridge rectifier 604, the output of which is connected through a filter section including capacitors 605, 606, and 607, choke coils 608 and 609, and resistor 610 to provide a source of positive D.-C. voltage or B+ over leads 611 and 612 for various electronic components in the subsurface equipment. Transformer 602 has its secondary connected oevr leads 615 and 616 to the signal converter section 206 to drive the coils thereof, as will be explained below, and the secondary of transformer 603 is connected to various filaments in the electronic components of the subsurface equipment (not shown).

The function switch 207 includes a relay 612 connected across resistor 610 in the subsurface power supply 201 by leads 617 and 618. This arrangement, as long as current is flowing over conductor 1 to the subsurface power supply 201, maintains function switch 207 energized and the swingers are operated to front contacts 1 and 3. The contact positions 1 and 3 are those cooperating with the receiver circuit to permit the detected signal to be placed on conductors 2 and 3 for transmission to the surface equipment. More particularly, the swinger associated with contacts 1 and 2 is connected to conductor 3 and the swinger associated with contacts 3 and 4 is connected to conductor 2.

The transmitter power supply 202, as discussed supra, includes a crystal oscillator 221, push-pull amplifier 222, a constant-K low-pass filter 223, a regulator circuit 224, and a bias supply 225. The purpose of the transmitter power supply 202 is to provide a constant frequency, substantially constant voltage across output leads 208 and 209 which connect to respective terminals of the transmitting coil 210. Generally speaking, the oscillator 221 provides the controlled frequency signal and the regulator circuit 224 cooperates with the output of the transmitter power supply 202 to maintain the amplitude of the output voltage substantially constant.

The oscillator 221 includes a pentode 620, a 20 kc. crystal connected between the control grid terminal of tube 620 and ground, and a tuned, L-C circuit including capacitor 622 and inductor 623 connected between the plate of tube 623 and the source of B+ over lead 611. A resistor 624 shunts the crystal 621 and the cathode resistor 625 is shunted by capacitor 626 to prevent A.-C. degeneration. The output load for tube 620 is transformer 627, the primary of which is connected through coupling capacitor 628 to the plate of tube 620 at one terminal and at its other terminal to ground. The screen grid of tube 620 is connected through resistor 629 to the source of B+ on lead 611 and to the plate of the regulator tube 701 in the regulator circuit 224.

With the circuit components of the oscillator 221 connected as described above, a closely controlled 20 kc. output is obtained across the secondary of transformer 627 for application to the push-pull, class B amplifier 222 which includes pentodes 702 and 703 connected in parallel to operate as a push-pull power amplifier.

The low-level output signal across the secondary windings 630 and 631 of transformer 627 are amplified and stabilized by the amplifier 222 to provide the substantially constant current flow through the plate load inductor 704 connected between the plates of the tubes 702 and 703 which one expects from pentodes. One terminal of the output winding 630 is connected through resistor 705 to the control grid of tube 702 and one terminal of output winding 631 is connected through resistor 706 to the control grid of tube 703. The other terminals of output windings 630 and 631 are conneted through respective resistors 707 and 708 to a common point which in turn is connected to the power supply 225 which supplies the bias for the amplifier 222. The cathodes of tubes 702 and 703 are commoned to ground and the respective plates of tubes 702 and 703 are connected through respective capacitors 709 and 710 and respective resistors 711 and 712 to one terminal of its counterpart output windings 631 and 630.

The latter connection provides a positive feedback loop from the plate of tube 702 to the control grid of tube 703 through winding 631 and resistor 706 and from the plate of tube 703 to the control grid of tube 702 through winding 630 and resistor 705. The use of positive feedback permits a relative light loading to be placed on the output of the oscillator 221 and, hence, provides less demand on its stability. At the same time it acts to assure that the output across the plates of tubes 702 and 703 act more like a constant current output for reasons to be developed below. Aside from this particular use of positive feedback to stabilize the output of the amplifier 222, it is conventional in operation. The output load 704 between the plates of tubes 702 and 703 is center-tap connected to the screens of the tubes 702 and 703 and to the source of B+ on lead 611 which maintains the screens at a constant potential and provides B+ for the plates of the tubes 702 and 703. This arrangement enhances the propensity of pentode tubes to have constant current output characteristics.

The push-pull output across the plates of tubes 702 and 703 is fed through coupling capacitors 713 and 714 to a constant-K, low-pass filter 223. This filter comprises parallel pairs of condensers 715—716 and 717—718 connected between the plates of the respective tubes and ground. The terminals of the capacitors are separated at their plate connections by inductors 719 and 720, respectively. The output from the constant-K filter 223 is applied to the leads 208 and 209. Lead 209 is connected directly to one terminal of the transmitter coil 210, while lead 208 is connected through a thermistor compensating circuit to the other terminal of transmitting coil 210. The thermistor compensating circuit includes a thermistor 721 connected in parallel with a fixed resistor 722.

The low-pass filter 223 is of constant K derivation which means that the product of the input and output impedances is equal to a constant. Hence, by maintaining substantially a constant current input, the filter transforms the constant current to a substantially constant voltage across leads 208 and 209, which is what is desired for driving the transmitting coil 210. With a substantially constant voltage across the transmitting coil 210, any variations in resistivity of the formations are reflected in changes in the current flowing therethrough. As a consequence, they may be more or less directly measured by the receiving equipment to provide an indication of the lithological characteristics of the subsurface formations.

Isolation transformers 723 and 724 are connected across leads 208 and 209 to act as inputs to the regulator circuit 224 and the bias supply 225.

Considering the bias supply 225 first, the output across leads 208 and 209 is sampled across the primary of transformer 724. It is thereafter converted to direct current and applied to the common connection of resistors 707 and 708 in the amplifier circuit 222. The rectifying and filter circuit of the bias supply 225 includes a pair of diodes 725 and 726 in each leg of the secondary of transformer 724, a coil 727, capacitors 728—730, and resistors 731—733. In addition to furnishing the fixed bias to amplifier 222, bias supply 225 also places a bias voltage at the center tap of the secondary winding of transformer 723 in the regulator circuit 224. This circuit may be traced from the center-tap of the secondary winding of transformer 724 to the series pair of resistors 734—735 and over lead 736 to the center tap of the secondary winding of transformer 723. While the bias supply 225 provides a source of bias to the control grids of tubes 702 and 703 as well as to the regulator circuit 224, such bias might have been provided by a heavier subsurface power supply 201. However, in the instant case, the output across leads 208 and 209 from the transmitter power supply 202 does not degrade the output to any degree, and at the same time provides a simple technique for obtaining the high fixed bias required by the class B amplifier 222.

The output across leads 208 and 209 which is sampled by the primary of transformer 723 is rectified in the regulator circuit 224, filtered, and applied to the grid of regulator tube 701. Rectification occurs after the secondary of transformer 723 and includes diodes 737 and 738 along with filtering capacitors 739 and 740 and dropping resistor 741. The cathode of regulator tube 701 is grounded and the plate is connected, as previously mentioned, to the screen grid of the oscillator tube 620. With the circuit arrangement as shown, the variation in voltage across the output leads 208 and 209 of the transmitter power supply 202 is detected, rectified, and used to control the conduction through regulator tube 701. Tube 701, in turn, acts to increase or decrease conduction through the oscillator tube 620. As noted before, the regulator 224 actually regulates only the amplitude of the output current from the transmitter power supply 202, not its frequency, since the grid-controlled crystal 621 is depended upon to maintain adequately the 20 kc. frequency. This particular technique of sampling the output, converting it to a direct current to control the oscillator output is a distinct improvement over conventional feedback systems because the controlling of an oscillator by an A.-C. feedback loop usually causes spurious oscillation due to phase shifts in elements in the feedback loop. In the present system, the use of a D.-C. control voltage reduces the bandpass of the negative feedback circuit to effectively zero and, therefore, the instability problem associated with the oscillator feedback path is avoided.

Ordinarily any temporary tendency of the transmitter power output to decrease or increase will be compensated for by the negative feedback loop for the oscillator 221. When a substantial change in transmitter coil impedance, due to changes in the subsurface formations, is encountered, it is detected by the isolation transformer 723 which converts the sample voltage into a D.-C. signal which controls the conductivity of the regulator tube 701 to change the output of the oscillator 221. For example, as the voltage sampled by the isolation transformer 723 tends to rise, the conduction of the regulator tube increases. This lowers the voltage on the screen grid of the oscillator tube 620 and therefore decreases conduction therethrough. This decrease in conduction through oscillator tube 620 decreases its output and in turn lowers the output voltage to the amplifier 222, and hence lowers the output from the overall transmitter power supply 202. This lowering of the output voltage from the transmitter power supply 202 compensates for the tendency of that voltage to rise. On the other hand, if the voltage detected by the regulator 224 tends to decrease, conduction through the regulator tube 701 is decreased, which increases conduction through the oscillator tube 620 with a subsequent increase in the output of the oscillator 221 to the amplifier 222. Thus, the overall output of the transmitter power supply 202 overcomes the tendency toward the decreased voltage originally detected.

As noted in the general description with reference to FIGS. 1 and 2, the oscillator output is a 20 kc. exciting current selected in order to maximize the response of the coil system while at the same time staying with a frequency low enough to prevent adverse skin effect from harming the overall system. It will be remembered that the response of the system is proportional to the current times the frequency squared; thus, the obvious answer is to increase the current frequency to improve the response, particularly since you improve it by the square of the frequency. However, the frequency cannot be chosen without regard to skin effect which occurs in any conductive medium when waves are propagated therethrough. Consistent with a satisfactory response, therefore, it is desirable to minimize the skin effect which would interfere with the useful signals correlatable with the subsurface formations adjacent the coil system. Practical experience indicates that a 20 kc. signal is about as high as can be selected without the skin effect interfering with the lithological information signals.

Figure 7:
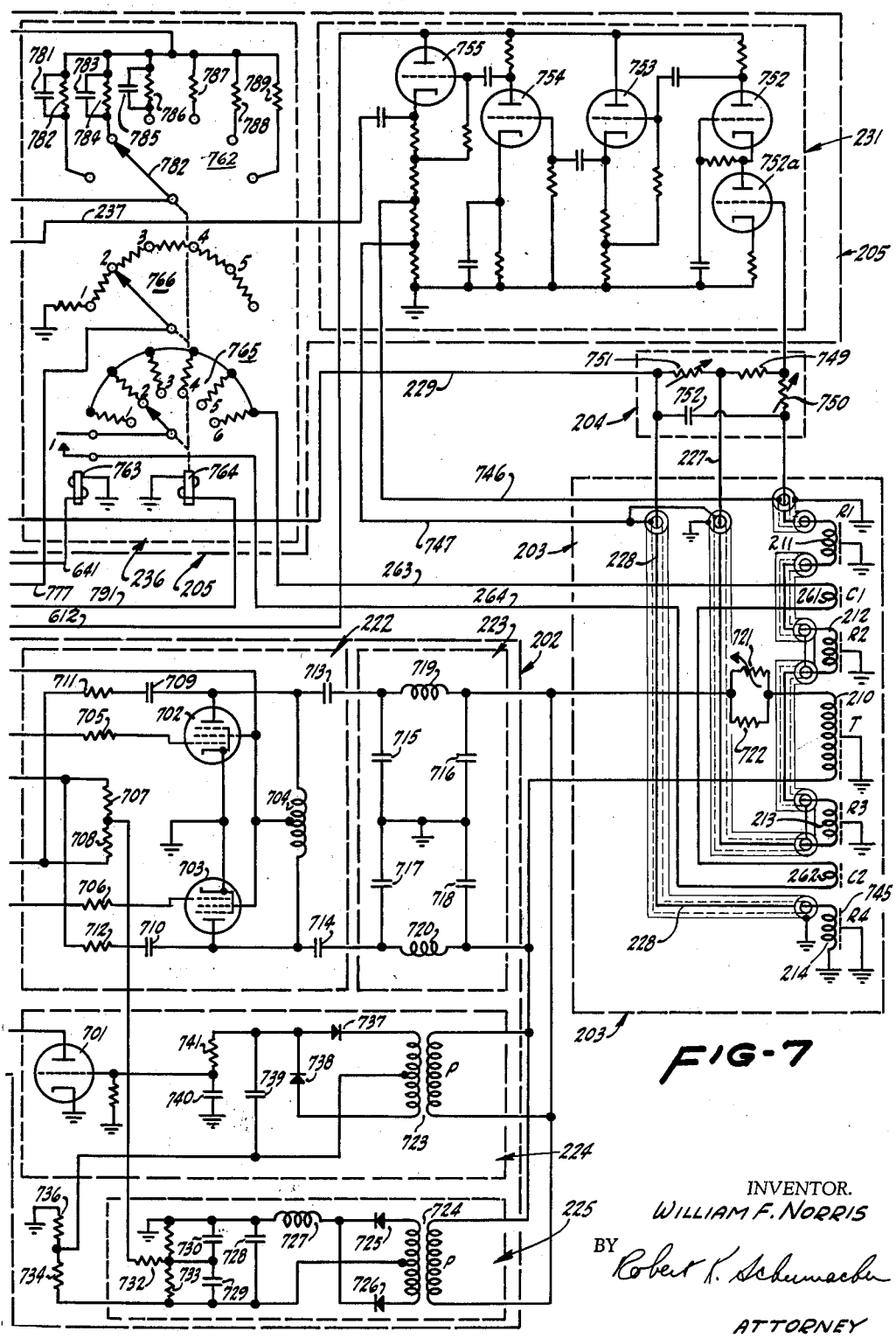

Now that the source of power for the coil system 203 has been described in detail, it is well to consider the coil system itself. The coil system includes a central transmitting coil 210 with four receiving coils 211—214 and a pair of calibrating coils 261 and 262 disposed above and below them at preselected distances. The relationship of these coils physically in the logging tool is as illustrated in FIG. 7 of the detailed schematic except that the distances between the coils, the number of turns on each coil, and polarities are obviously not represented accurately. As is well known in the field of inductive coupling, any two-coil system has in the receiver coil thereof a signal which is the combination of the secondary field established by the current induced in the formation by the transmitting coil field and the voltage mutually induced between the coils. One of the purposes in using a multiple coil system, beyond that of focusing or desensitizing to preselected lateral depths, is to eliminate or neutralize the mutual inductance between the transmitting coil-receiver coil combinations. In the five-coil system exemplified in the functional schematic of FIG. 2 and in the detailed schematic of FIG. 7, this is done by serially connecting four receiver coils 211—214 and oppositely winding the two coils on either side of the transmitter coil 210. In the present case this means that the mutual between the transmitting coil 210 and, say, the uppermost receiving coil 211 is made equal and opposite in phase to the mutual inductance between the transmitting coil 210 and the auxiliary or focusing coil 212. In a similar vein, on the lower side of the transmitter coil 210, the coil turns and the distances between the coils are proportioned to have compensating mutuals, i.e., between the transmitting coil 210 and the receiving coil 214 as compared to the auxiliary or focusing coil 213. Theoretically, by the use of these oppositely poled and differently wound receiver coils, the mutuals vectorially add and the overall sum is zero. In actual practice, of course, the mutuals are not absolutely balanced. Instead, there remains a small component that is of unknown amplitude and phase angle. The function of the balancing network 204, previously mentioned, is to overcome or eliminate this residual mutual which epitomizes the difference between theory and practice.

Before considering how this balancing network 204 operates to eliminate the residual mutual, however, note that the receiver coils 211, 212, and 213 are serially connected and fed to the balancing network 204 through leads 226 and 227, while the receiver coil 214 is connected between ground and lead 228 which in turn connects to the balancing network 204 as well as to the input of the reference amplifier 233. Also note that the calibrating coils 261 and 262 are located intermediate the receiver coils 211—212 and 213—214, respectively, and are connected over leads 263 and 264 to a deck in the sensitivity calibrating circuit 236 for a purpose to be explained below.

Also, it will be remembered that the transmitter power supply 202 is connected to the transmitter coil 210 on one side through a parallel circuit including a thermistor 721. The thermistor 721 and its shunt resistor 722 are selected in order to compensate in the tuned transmitter circuit for variations in resistance due to temperature. As is well known in the well logging art, variations in temperatures in a borehole are substantial. Most of the time electrical and inductive well logging systems are expected to operate in extremely high temperatures and hence some technique must be employed to prevent temperature excursion which substantially affects the tuning of the circuit. Changes in the resistance of the copper wire in the transmitter coil tend to vary the Q of the tuned circuit. The thermistor is chosen to have a negative temperature coefficient numerically equal to the positive coefficient of the copper wire.

The tuned circuit, including the transmitter coil was mentioned previously but not described in detail. As set forth there, the incorporation of the transmitter coil in a tuned circuit results in higher current flow and therefore higher signal levels. The tuned circuit includes the transmitter coil 210 and an equivalent capacitor, which might be called $C_1$, that includes capacitors 717 and 718 of the constant K filter 223. The high Q is obtained by using anti-capacitive windings in the transmitter coil, Litz-type wire, and high quality, low-loss capacitors.

Another construction detail to observe in connection with the transmitting coil 210 and the receiving coils 211—214 are the Faraday shields 745 which surround them and are connected to ground. The Faraday shield, a convolute plurality of electrical paths, reduces the capacitive coupling in the coil system. Beyond the use of Faraday shields in connection with the coils 210—214, a series of driven shields is employed to further reduce the interelectrode capacitance and interaction in the coil system. This is done by shielding the leads to coils 211—214 with double shielded cable. The inner shield is driven by a voltage equal in amplitude and phase to the signal voltage flowing through the leads while the outer shield is connected to ground. By driving the inner shield with a voltage having a constant relation to the signal on the shielded lead, it is possible to hold the distributive capacitance between the lead and shield to a low value. Since these are driven at a constant difference, which is substantially zero, no current flows between them and there is no effective distributive capacitance to speak of. Naturally enough, there will be capacitance between the inner shield and the outer shield which is grounded, but this distributed capacitance does not influence the signal voltages and hence is of little importance in the practical system. The distributed capacitance must be lowered to avoid lowering the resonant frequency of the receiver coil system (for a given inductive reactance), which it is desirable to keep as high as possible. If the distributed capacitance is too large and, if not corrected, the resonant frequency of the coil system could conceivably go below the 20 kc. oscillator current. This would make the coil system look capacitive rather than inductive, and the circuit would not work well for its intended purpose.

To drive the inner shield, a potential is picked off the output of the preamplifier 231 (lead 746) in the receiver circuit 205 and fed to the shield adjacent the upper terminal of receiver coil 211. Since the drop through the receiver coil 211 is substantially as great as the drop through the remaining receiver coils, a lower voltage is sampled over lead 747 for application to the receiver coils 214—12. Here again, the outer shields are grounded in order to complete the driven shield arrangement.

Turning from the physical construction and electrical connection of the coils in the coil system 203, it is appropriate now to consider the balancing network 204 and the way in which it acts to eliminate the residual mutual in the receiver coil system in order that the input to the preamplifier 231 of the receiver circuit 205 represents the influence of the formation on the field established by the transmitter coil 210 rather than, partially, the effect of the mutual inductance in the receiver coil system. The balancing network 204 includes a fixed resistor 749 and a variable potentiometer 750 serially connected across the receiving coils 211, 212, and 213. Another variable potentiometer 751 connects the lower side of these receiver coils to the upper terminal of receiver coil 214 by way of leads 227 and 228. Finally, a capacitor 752 is connected in shunt of coils 211—213 and variable potentiometer 751. The output of the coil system as applied to the preamplifier 231 (between junction of potentiometer 750 and resistor 749 and ground) is equal to the arithmetic sum of voltages—mutual or signal—in receiver coils 211—214. More accurately, the total output voltage equals the sum of the voltage across coil 214, resistor 749 (which shunts series-connected coils 211—213 and potentiometer 751) and potentiometer 750. Thus, $E_{total} = E_{214} + E_{751} + _{749}$. With the coil system in air (zero signal voltage), potentiometer 750 is varied to vary the balancing voltage amplitude and the balancing voltage is shifted in phase by varying the potentiometer 751 which cooperates with capacitor 752. These two potentiometers are varied until the $E_{total} = 0$. The output of the balancing network 204 is fed to the input of the preamplifier 231, while the reference signal from coil 214 is directed over leads 228 and 229 to the input of the reference amplifier 233.

The receiver circuit 205, it will be remembered, includes the preamplifier 231, the signal amplifier 232, the phase sensitive detector 234, as well as a reference amplifier 233, a phase shifting network 235, and a sensitivity calibrate circuit 236. The signal output from the balancing network 204 traverses the preamplifier 231, the sensitivity calibrate circuit 236 and signal amplifier 232 to form one of the two inputs to the phase sensitivity detector 234. These circuits act primarily to amplify the signal and, in the sensitivity calibrate circuit 236, attenuate to a preselected level consonant with the desired sensitivity setting. The other input to the phase sensitive detector 234 is obtained from the reference signal and reference amplifier 233, which will be elaborated upon subsequently.

Due to the desirability of having a wide-band preamplifier 231, a cascode input stage is employed. It includes tubes 752 and 752a followed by a cathode follower stage including tube 753, a conventional triode amplifier stage including tube 754, and a cathode follower output stage including tube 755. The cascode input stage is employed because it has an extremely low input noise figure, yet it develops a high gain. The succeeding cathode follower stage (including tube 753) is employed to reduce the impedance to a low value for application to the grid of triode 754, which amplifies the signal and applies it to the cathode follower output tube 755 which assures a low output impedance on lead 237 which is connected to the input of the signal amplifier 232.

The cathode follower stages are necessary, particularly the output one, because the amplifying tubes have high input capacitances, and it is desirable to minimize their effect on the bandpass characteristic of amplifier 231. A broadband preamplifier 231 is desired in order to work the circuit in a region where the phase is relatively constant and small variations in signals will not be affected or will not influence the phase. Otherwise, if temperature and drift, etc., affect the preamplifier 231, the passband of the filter may be shifted adversely. The cascode input stage comprising tubes 752 and 752a is capacitively coupled to the cathode follower stage including tube 753 which in turn is coupled to the RC amplifying stage including tube 754. The R.C stage is, in turn, capacitively coupled to the cathode follower output. Necessary resistors and decoupling capacitors are used in conventional ways in this circuit to obtain proper biasing of the tube components.

As noted earlier in discussing the driven shields, the high and low voltages are obtained over leads 746 and 747. The high voltage on lead 746 is taken off of a voltage divider series of resistors in the cathode circuit of tube 755 and the lower voltage on lead 747 is sampled at the junction of another pair of resistors in this cathode circuit.

The cathode follower output from tube 755 and the preamplifier 231 is capacitively coupled to lead 237 which is thereafter connected through resistors to the cathode and grid of input tube 660 in the RC coupled signal amplifier 232. This amplifier 232 also includes an output stage including tube 661 capacitively coupled thereto. Beyond the output of the preamplifier 231 being connected to the grid of tube 660, the cathode of tube 660 is directly connected to the wiper of a six-position switch deck 762. The different positions traverse various attenuating pads to a common juncture at the plate of the output tube 661. Whenever the wiper of the sensitivity deck 762 is set at one of the positions 1–6, the cathode of input tube 660 is connected through a preselected attenuator pad to the plate of the output tube 661. While the operation of the sensitivity potentiometer 762 will be explained in connection with the sensitivity and calibrate operations themselves, it is sufficient here to note that by selecting a particular position of the sensitivity deck the ultimate output of the signal channel is affected to a variable degree.

Before briefly describing the operation of the signal amplifier 232, which is more or less conventional, it might be noted that the reference amplifier 233 is substantially identical to it except that, rather than couple the plate of its output tube 661a to the cathode of input tube 660a through a sensitivity attenuator, a fixed resistor 662a is employed. Taking the signal amplifier 232 first, it can be seen to include beyond the tubes 660 and 661, a coupling capacitor 663, plate load resistors 664 and 665 which are respectively connected through a dropping resistor to the B+ supply on lead 611 and a capacitor to ground. Beyond these and the conventional cathode and grid leak resistors, the amplifier 232 includes an isolation transformer 766 capacitively connected to the plate of tube 661. Transformer 666 forms an input to the phase sensitive detector 234. The reference amplifier 233 in a similar manner includes plate resistors 664a and 665a and a coupling capacitor 663a between the two stages of the amplifier. An isolation transformer 666a is also provided to couple the reference amplifier 233 to the phase-shifting network 235.

The secondary winding of isolation transformer 666, associated with the signal amplifier 232, is connected to the control grids of pentodes 667 and 668 in the phase-sensitive detector, whereas the secondary of the isolation transformer 666a, associated with the reference amplifier 233, is commoned through respective capacitor 669 and variable potentiometer 670, which components form the phase-shifting network 235, to lead 671. Lead 671 is connected to the junction of resistors 679 and 680 shunted across the secondary of the isolation transformer 666.

The phase-shifting network 235 by adjustment of potentiometer 670 acts to shift the phase of the reference signal, detected by receiver coil 214, to an in-phase condition with the transmitter current. The signal detected by the receiver coil 214 and used as a reference to the phase-sensitive detector 234 is largely the mutually induced signal from the transmitter coil 210 to receiver coil 214. The field established by transmitting coil 210 as influenced by the subsurface formations and detected by the receiver coil 214 is small compared to the mutual coupling signal. This being true, the signal induced in receiver coil 214 is substantially 90 degrees out-of-phase with the transmitter current. This must be corrected before the signal is used by the phase-sensitive detector 234 as a reference. The phase-shifting network 235 acts to shift this signal 90 degrees—so that it is in phase with the transmitter current— for application to the phase-sensitive detector 234.

Beyond connecting the terminals of the secondary winding of isolation transformer 666 of signal amplifier 232 to the control grids of tubes 667 and 668, the phase-sensitive detector 234 includes phase load resistances 672 and 673 for the respective tubes 667 and 668. Tube 667 includes a cathode dropping resistor 674 connected to ground and its screen grid is connected to the screen grid of tube 668 and both are connected through an RC circuit to ground (capacitor 686 and resistor 687). The plates of tubes 667 and 668 beyond being connected through their respective load resistors to the source of B+ on lead 611 are also connected through capacitors 676a and 676b to ground. Finally, the plate of tube 667 is connected to the swinger of the D.C. to A.C. converter coil 677 forming part of the signal converter section 206. The plate of tube 668 is connected to the center tap of the transformer 678 of the signal converter section 206 and the two terminals of the primary winding of transformer 678 are connected to contacts 1 and 2 driven by the D.C. to A.C. converter coil 677.

Ignoring for the moment the presence of a signal voltage at the secondary of transformer 666, it can be seen that the reference signal over lead 671 is applied intermediate resistors 679 and 680 to provide the fixed bias for the phase-sensitive detector 234. In the absence of signals on the grids of the tubes 667 and 668, the reference voltage is applied through the resistors 679—680 to the grids of the tubes and biases them substantially to cut-off in some cases. During each positive half-cycle of the reference voltage, tubes 667 and 668 tend to conduct and during the negative half-cycle they are driven further towards cutoff. Thus, the output is a series of positive half-cycle pulses at the plates of tubes 667—668. When a signal is applied to the grids of the two-stage phase-sensitive detector 234, a positive signal is applied to the grid of one tube and a negative signal to the grid of the other. Thus, what happens is that the plates of the tubes reflect in one case a sum of the reference and signal voltages and, in the other case, the difference between the two. The capacitors 676a and 676b integrate the outputs at the plates of tubes 667 and 668 to add the sum and difference of the reference and signal voltages. The output fed to the signal converter section 206 is, therefore, a D.-C. voltage proportional to the in-phase component of the A.-C. signal. The out-of-phase components are eliminated by the integration action of capacitors 676a and 676b. The in-phase component, which is the one proportional to conductivity, is fed through the signal converter section 206 and over conductors 2 and 3 of the cable to the surface equipment.

Because of the integrated output across the plates of the two-stage phase-sensitive detector 234 appears as a rectified signal, the signal converter section 206 converts it to an alternating current which is transformed by transformer 778 and thereafter rectified for transmission to the surface equipment as a low impedance D.-C. signal.

The signal converter section 206 includes the D.C. to A.C. converter coil 677, transformer 678 and an A.C. to D.C. coil 679. The plate of tube 667 is tied to the swinger of coil 677, as previously noted, and the plate of tube 668 is tied to the center tap of the primary winding of transformer 678. The terminals of the primary winding of transformer 678 are connected to contacts 1 and 2 associated with the coil 677. The secondary winding of transformer 678 is connected to contacts 1 and 2 associated with coil 679 and the swinger thereof is connected over lead 680 to front contact 3 associated with coil 612 of the function switch 207. The center tap of the secondary winding of transformer 678 is connected over lead 681 to contact 1 of relay 612 in the function switch 207. The swingers associated with contacts 1 and 3 of relay 612 are connected directly to conductors 3 and 2, respectively. The driving power for the coils 677 and 679 of the signal converter section 206 is provided by the secondary winding of transformer 602 over leads 615 and 616, as previously indicated. As long as power is supplied to subsurface power supply 201 over conductor 1 and sheath ground, the coils 677 and 679 of the signal converter section 206 synchronously convert the output signal of detector 234 to an alternating current and rectify it to form a reconstituted D.-C. signal for transmission to the surface equipment.

As previously noted, the relay 612 of the function switch 207 is maintained operated as long as power is supplied to the subsurface power supply 201. This means lead 680 is connected over front contact 3 of relay 612 to conductor 2 and lead 681 is connected over front contact 1 of relay 612 to conductor 3. Whenever the power is removed from the subsurface power supply 201, relay 612 releases and conductors 2 and 3 are connected through back contacts 2 and 4 to leads 777 and 791 associated with the sensitivity-calibrate circuit 236.

*Surface Equipment (Recording)*

At this point, the D.-C. signals applied to conductors 2 and 3 for transmission to the surface represent the in-phase components of the field established by the transmitter coil 210 as sampled by the receiver coil assembly, particularly coils 211—213. This being true, the only remaining interest in the signal is its amplitude and it is proportional to the conductivity of the formation adjacent the coil system 203. The signal applied to conductors 2 and 3 is transmitted to the surface equipment and more particularly acts as an input to the sensitivity-calibrate switching power supply 104. Conductors 2 and 3 are connected to the wipers of the respective function switches 531 and 532 in this latter circuit. During normal operation of the induction logging system these two manually operated three-position selector switches are set in their operate position (Op). This applies the signal across conductors 2 and 3 over leads 145 and 146 to the input of the reciprocal computer circuit 102. In cases where the system is being calibrated or the sensitivity attenuators are being switched in the subsurface instrument, conductors 2 and 3 are not connected to leads 145 and 146. Rather, they cooperate with certain other circuits in the sensitivity-calibrate switching power supply 104 and the position indicator 103. For present purposes it is sufficient to note that the signal across conductors 2 and 3 is applied over leads 145 and 146 to the input of the reciprocal circuit 102 during normal operation.

The in-phase component signal on leads 145 and 146 is applied to the D.C. to A.C. converter 131 which acts to convert the direct current to an alternating current signal for application to one side of the input of the differential amplifier 133. The D.C. to A.C. converter 131 includes a transformer 440, the primary of which is connected to contacts 1 and 2 of the synchronous driving coil 441 in the drive circuit 132 as well as to resistors 442 and 443. The common point of resistors 442 and 443 connects to lead 146 and to the swinger of the synchronous relay 441. The secondary of transformer 440 is connected across a variable potentiometer 444, the wiper of which is connected over lead 445 to one terminal of the primary of the input transformer 446 of differential amplifier 133.

With manual switch 447 closed in the driving circuit 132, alternating current source 136 acts to synchronously operate the driving relays 441 and 448, the latter being associated with the feedback circuit employed to control the servo motor 135 by way of the differential amplifier 133. For the moment, with the relay 441 synchronously driven by the source 136, the swinger thereof acts to synchronously rectify the input D.-C. signal on leads 145 and 146, the former lead connected to the center tap of the primary of transformer 440, and apply it through the variable potentiometer 444 and over lead 445 to one side of input transformer 446.

The other terminal of the primary winding of transformer 446 is connected over lead 449 to the wiper and one side of a variable potentiometer 450 connected across the secondary of transformer 451 in the feedback D.C. to A.C. converter 134. The primary winding of transformer 451 is grounded at its center tap and its terminals are connected to contacts 1 and 2 of driving relay or coil 448 in the driving section 132, and also through resistors 452 and 453 to a common point with the swinger of relay 448. The common point connection between resistors 452 and 453 is further connected through a parallel RC circuit including resistor 454 and capacitor 455 to the wiper of feedback potentiometer 140 in the servo system. The wiper of linear potentiometer 140 is further connected to A.C. ground through capacitor 456.

The potentiometer 140 is connected across positive battery 137 and the circuit includes dropping resistors 457a and 457b. A variable potentiometer 458 shunts the potentiometer 140 and positions the shaft of the servo system for any arbitrary zero. This balances out any residual signal existing when the tool is supported in an air medium. By proper selection of the resistors 457a and 457b, a preselected potential is placed across the linear potentiometer 140 and, depending upon the position of the shaft of motor 135, the wiper associated with potentiometer 140 detects a preselected feedback voltage for application to the D.C.-A.C. converter 134. As briefly described previously, the output of the D.C. to A.C. converter 134 is applied over lead 449 to the other terminal of input transformer 446. With this arrangement, whenever the incoming signal over leads 145 and 146 (as converted to an alternating current and applied to the differential amplifier 133) changes the differential amplifier 133 provides an output for the motor 135 which causes it to rotate. The motor 135 rotates and converts the incoming signal on leads 145 and 146 to a comparable shaft rotation. When this shaft rotation rotates the wiper of potentiometer 140 to the point where the feedback voltage compensates or neutralizes the change in input voltage, the differential input is reduced to zero and the motor stops rotating. Thus, with this point of equilibrium reached, the potentiometers 138 and 139, also driven by the shaft of motor 135, act to provide direct readings of the resistivity and conductivity of the subsurface formation at that instant adjacent the coil system.

The differential amplifier 133 is partially detailed to illustrate a typical differential driving amplifier for the servo mechanism system. This exemplary embodiment includes a tube 461 and a dual triode 462. The secondary of transformer 446, forming the input to differential amplifier 133, is connected between ground and the grid of tube 461. The plate includes a load resistor and source of B+ and is capacitively coupled to the grids of the sections of tube 462 and the cathodes of the sections are commoned through a dropping resistor to ground. The plates of the sections of tubes 462 are connected to the terminals of the primary winding of an output transformer 463 and the secondary thereof is connected through a manually operable switch 464 and source of alternating current 136. With the switch 464 closed, alternating current from source 136 flows through one winding of the motor 135. The other winding is connected between ground and the center tap of the primary of transformer 463 so that whenever an output appears on tube 462, motor 135 is caused to rotate in a direction depending upon whether the signal as compared to the fixed field current is in or out of phase. Motor 135 rotates which in turn rotates the wipers of linear potentiometers 138—140 until such time as the feedback voltage detected across linear potentiometer 140 and applied through D.C. to A.C. converter 134 and over lead 449 to the input of the differential amplifier 133 reduces the differential input to zero. At this time the motor shaft stops rotating and the wipers associated with potentiometers 138 and 139 give direct readings of the conductivity and resistivity of the subsurface formation adjacent instant positions of the coil system.

Motor 135 is a split phase type which means if the amplifier 133 output is in phase with the field winding current, it rotates in one direction and if it is out-of-phase, it rotates in the other.

The resistivity potentiometer 138 is connected at one side to the positive terminal of battery 137 and the other side floats. With this arrangement the wiper directs the current flowing in the circuit to galvanometer 141 which provides a direct reading of the resistivity of the formation. This result is obtained because the shaft position, which is responsive to conductivity, determines the resistance in series with galvanometer 141. Therefore, the current flowing through galvanometer 141 is directly proportional to the resistivity and inversely proportional to conductivity. On the other hand, potentiometer 139 is connected between ground and the positive terminal of battery 137 and galvanometer 142 measures the potential difference between the wiper and ground. This permits the galvanometer 142 to provide a direct reading of the conductivity of the formation.

By using this reciprocating servo system, which provides both the conductivity and resistivity values, there is no possibility that the parameters will independently drift to the point where one is not the reciprocal of the other. Whereas, some existing description, induction logging systems obtain conductivity and resistivity values which are not reciprocals of each other.

The resistor 450 associated with the D.C.-A.C. converter 134 in the reference feedback path is employed to match the transformer 451. The gain control 444 in the D.C.-A.C. converter 131 is adjustable to set the sensitivity of the servo system. That is to say, by varying this gain control 444, full scale deflection as it relates to the degrees of rotation of the shaft of the servo system can be changed. The reference voltage is set at a given level by selecting resistors 457a and 457b, and the gain control 444 selected the degrees of rotation for a given signal. For example, using a 2000 "milli-mhometers" scale, 320 degrees of rotation provide full scale deflection. Other variations can be made in order to make the servo system more, or less, sensitive to incremental changes in the signal voltage.

*Position and Calibrate Circuits*

The position and calibrate circuits include position indicator 103, sensitivity-calibrate switching power supply 104 and the subsurface sensitivity-calibrate circuit 236. Referring to the sensitivity-calibrate switching power supply 104 (FIG. 5), it can be seen to include a source of alternating current 105 and transformers 541 and 542 connected in parallel with the source 105 and, cooperating in one leg with the manually operable off-on switch 543. With the switch 543 closed, alternating current from source 105 is placed across the primaries of transformers 541 and 542. The secondary of transformer 542 is connected to ground at one terminal and through a diode 544 and a manually operable calibrate switch 545 to lead 146 at its other terminal. Lead 146 is connected to the operate (Op) and calibrate (c) positions of three-position switch 531. The secondary of transformer 541 is connected to the input terminals of a conventional bridge rectifier 546 and the output terminals are connected to ground and through the manually operated switch 547 to the switch position (Sw) of three-position switch 531. As noted before, the wiper of switch 531 is connected to conductor 2.

With the switch 543 closed to apply alternating current power across the primary winding of transformers 541 and 542 and function switch 531 is in the calibrate position, closure of the switch 545 provides a D.-C. switching voltage over conductor 2 for the subsurface equipment. Similarly, by operating switch 547, a D.-C. switching voltage is applied to the switch position (Sw) of three-position switch 531.

Since the calibrate and operate positions of switch 532 as well as switch 531 are commoned to respective leads 145 and 146, calibration requires only that the calibrate switching voltage be applied over lead 146 and conductor 2 to the subsurface sensitivity-calibrate circuit 236. The path of this source of control voltage is through conductor 2, over front contact 3 of function switch relay 612 and lead 641 to one side of calibrate relay 763. The other side of the winding of calibrate relay 763 is connected to ground so that any time a calibrate voltage is applied, a resistor acting as a dummy load is placed across serially connected calibrate coils 261 and 262 by way of leads 263 and 264.

The sensitivity-calibrate circuit 236 includes a six position stepping switch having a driving relay or coil 764 and a calibrate deck 765, a position deck 766 and a sensitivity deck 762. The calibrate deck 765 includes different resistive loads, each connected between a contact position, and a common point connected to lead 263. Since the wiper of calibrate deck 765 is connected to the wiper of calibrate relay 763 and contact 1 of this latter relay is connected to lead 264, whenever relay 763 is operated by closing surface calibrate switch 545, one of the resistive loads is shunted across the calibrate coils 261—262. The particular position of the wiper of deck 765 is selected from the surface by the operation of the position indicator circuit 103 and switch 547. These involve manipulating the stepping switch coil 764.

The position deck 766 in the sensitivity-calibrate circuit 236 has a series of resistors connected between ground and position 1-2, 2-3, 3-4, 4-5, and 5-6. The wiper of deck 766 is connected over lead 777 to back contact 2 of relay 612 in the function switch 207. Since the resistance to ground at each switch position is different, by utilizing them as one leg of a bridge in the surface position indicator 103, an instant position of the subsurface equipment can be determined.

The sensitivity deck 762 of stepping switch 764 includes six different attenuator circuits commonly connected to lead 655 at one set of terminals and individually connected to contact positions 1-6 at their other terminals. Since the wiper of deck 762 is connected to the cathode of input tube 660 of the signal amplifier 232, as previously pointed out, by selecting a particular one of the positions, any one of six different sensitivity settings may be connected between the plate of a tube 661 and the cathode of tube 660.

In the exemplary embodiment of the present invention, for example, position 1 is connected through RC circuit including capacitor 781 and resistor 782, position 2 through an RC circuit including capacitor 783 and resistor 784, position 3 through an RC circuit including capacitor 785 and resistor 786, and positions 4, 5 and 6 through respective resistors 787, 788 and 789. The stepping switch relay 764 is controlled over lead 791 through back contact 4 of relay 612 associated with function switch 207 and conductor 2.

Whenever the switches 531 and 532 are switched to the switching position (Sw), the stepping relay 764 may be operated by repeated closures of the switch 547 in the sensitivity-calibrate switching power supply 104. To energize the subsurface stepping switch 764, however, requires the constant current regulator 101 be removed from conductor 1 so that power is not supplied to the subsurface equipment, i.e., relay 612 is released. With this condition obtaining, each time the switch 547 is closed and opened, the stepping relay 764 advances to the next position. This circuit, as noted below, it traced through three-position switch 531, through conductor 2, over back contact 4 of relay 612 and through lead 791 to one side of the switch 764, the other side of which is grounded. At the same time this channel is being used in cooperation with conductor 2 to step the relay 764, conductor 3 is connected through the switch position of three-position switch 532 to the position indicator 103 and over back contact 2 of relay 612 through lead 777 to the wiper of position deck 766.

Position deck 766 cooperates with the position indicator 103 to provide an indication at the surface of the instant position of the subsurface stepping switch 764. The actual position indicator 103 externally provides red and green light indications for the operator. If the operator selects a desired sensitivity and then actuates switch 547, he knows that the subsurface stepping switch 764 does not agree with the input as long as the red light shows. As soon as the position at the subsurface sensitivity-calibrate circuit 236 agrees with that of the position indicator 103 (manually set in), a green light appears on the position indicator panel. This has the obvious advantage of permitting an unskilled operator to know when a proper subsurface position has been reached without having to compare meter readings, etc.

The position indicator 103 includes a source of alternating power 105 connected across the primary of a transformer 570, and a manually operated switch 571 serially connected in the circuit. One secondary winding of transformer 570 is connected between ground and one side of a relay 571. The ungrounded terminal courses a dropping resistor 572 and a diode 573. The other terminal of the winding of relay 571 is connected to the plate of the tube 574. The ungrounded terminal of this secondary winding of transformer 570 is also connected over lead 575 to the common junction of resistors 567 and 577 which are shunted across the primary winding of transformer 578 in the grid circuit of tube 574. The secondary of transformer 578 is connected at one terminal to a pair of diodes in tube 574 and at its other terminal to the grid of tube 574. The cathode of tube 574 is grounded and connected through an RC circuit to the grid. The upper side of the primary winding of transformer 578 is also connected through a resistor 579 to position 6 of a manual range sensitivity switch 586. Resistor 580 is connected between positions 6-5, resistor 581 between positions 5-4, resistor 582 between positions 4-3, resistors 583 between positions 3-2, and resistor 584 between positions 2-1. Position 1 is connected through another resistor 585 to ground. The resistors between the adjacent switch positions of manual switch 586 can correspond to the resistors between adjacent switch positions on deck 766 in the sensitivity-calibrate circuit 236.

With this arrangement, the fixed resistors 576 and 577 form two legs of the bridge which also includes part of range switch 586 and subsurface position deck 766. Whenever the bridge is balanced, the voltage across resistors 576 and 577 is applied through transformer 578 to the grid of tube 574 which normally conducts. As long as tube 574 is conducting, relay 571 in its plate circuit is operated. Whenever the range switch 586 is set at a position which unbalances the bridge due to the lack of a comparable setting in the subsurface deck 766, tube 574 is driven towards cutoff which causes relay 571 to release.

A second output winding of transformer 570 connects to one terminal of red and green light indicators. The other terminals are connected to respective back and front contacts 1 and 2 of relay 571 and the swinger of relay 571 is grounded. Thus, as long as relay 571 is operated the green light is on but when relay 571 releases the red light comes on.

As noted, a desired position of the stepping relay 764 is obtained by manually setting range switch 586 to the desired position and thereafter operating switch 547 in the sensitivity-calibrate power supply 104 to cause the stepping switch 764 to step to the balanced bridge condition. It may be seen by examination that resistors 576 and 577 are ordinarily balanced and that portion of the resistance of manual switch 586 between ground and the instant position of the wiper must accord with the resistance between ground and the instant position of the wiper of the position deck 766 in order to maintain a balance. As a result of the foregoing, by establishing the instant position of the subsurface sensitivity-calibrate circuit 236 through relay 764 it is not only possible to select a desired sensitivity but also select the appropriate calibrate resistor for the selected sensitivity.

While the present improvements in induction logging systems have been described in detail with respect to a particular coil system, power supply, receiver circuit, sensitivity selection, etc., it should be remembered that they are only exemplary in nature. Numerous other arrangements can be devised by those skilled in the art without departing from the spirit and scope of the present invention. To this end, the invention should in no wise be limited except by the express language of the appended claims.

What is claimed is:

1. A system for investigating the lithology of formations surrounding a bore hole comprising, in combination, surface equipment; a logging tool; a cable including a plurality of conductors connecting said surface equipment to said logging tool; means including said cable operable to cause said logging tool to traverse the extent of the bore hole; a coil system forming a part of said logging tool and including at least one transmitting coil and at least two receiving coils disposed adjacent said transmitting coil in fixed relation thereto; a source of alternating power; means including said source, certain ones of said plurality of conductors and said transmitter coil to establish an electromagnetic field of preselected frequency in the formation adjacent said coil system; detecting means including at least a pair of said receiver coils to detect the secondary field established by the formations and said electromagnetic field by producing signals systematically related thereto, means to effectively eliminate voltages mutually induced in said receiver coils; means including fewer receiver coils than said detecting means to provide a reference signal; means responsive to said signals to separate out of said detected signals the component in-phase with the transmitting coil current; means including selected ones of said plurality of conductors for transmitting said in-phase signal to said surface equipment; and servo recording means forming part of said surface equipment and including a servo driven shaft controlled by differences between said in-phase signal and a generated reference signal to cause said shaft to rotate to translate said in-phase signal into an equivalent rotation of said shaft, each magnitude of said generated reference signal representing the rotative position of said shaft, and means cooperating with potentiometers driven by said shaft to record the conductivity and its reciprocal resistivity of the subsurface formations adjacent any given position of said coil system.

2. A system for investigating the lithology of formations surrounding a bore hole comprising, in combination, surface equipment; a logging tool; a cable including a plurality of conductors connecting said surface equipment to said logging tool; means including said cable operable to cause said logging tool to traverse the extent of the bore hole; a coil system forming a part of said logging tool and including at least one transmitting coil and at least two pairs of receiving coils symmetrically disposed about said transmitting coil in fixed relation thereto; a source of alternating current associated with said surface equipment; a transmitter power supply; means including said current source, said power supply, certain ones of said plurality of conductors and said transmitter coil to establish a constant frequency electromagnetic field in the formation adjacent said coil system; detecting means including said pairs of said receiver coils to detect the secondary field established by the formations and said electromagnetic field by producing signals systematically related thereto; means to eliminate voltages mutually induced in said receiver coils; means including fewer receiver coils than said detecting means to provide a reference signal; means to amplify said signals; means responsive to said amplified signals to separate out the component of said detected field signal in-phase with the transmitting coil current; means including selected ones of said plurality of conductors for transmitting said in-phase signal to said surface equipment as a D.-C. signal; and servo recording means forming part of said surface equipment and including a servo motor and shaft, a differential amplifier responsive to differences between said in-phase signal and a generated reference signal to cause the shaft of said motor to rotate to convert said in-phase signal into an equivalent angular position of said shaft, each different magnitude of said generated reference signal representing a unique angular position of said shaft, said amplifier producing an output to drive said motor until said generated reference signal reduces the differential input to zero, and means cooperating with linear potentiometers controlled by said shaft to record the conductivity and its reciprocal resistivity, of the subsurface formations adjacent an instant position of said coil system.

3. A system for investigating the lithology of formations surrounding a bore hole comprising, in combination, surface equipment; a logging tool; a cable including a plurality of conductors connecting said surface equipment to said logging tool; means including said cable operable to cause said logging tool to traverse the extent of the bore hole; a coil system forming a part of said logging tool and including a transmitting coil, two pairs of receiving coils symmetrically disposed above and below said transmitting coil in fixed relation, and calibrate coils; a source of alternating current associated with said surface equipment; a transmitter power supply; means including said current source, said power supply, certain ones of said plurality of conductors and said transmitter coil to establish a constant frequency-constant magnitude electromagnetic field in the formation adjacent said coil system; means including said pairs of receiver coils to detect the secondary field established by the said electromagnetic field adjacent formations and by producing signals systematically related thereto; means to eliminate voltages mutually induced in said receiver coils; means including at least one of said receiver coils to provide a reference signal; means to separately amplify said signals; means including a phase-shifting network responsive to said signals to separate out the component of said detected field signal that is in-phase with the transmitting coil current; means including said separating means to rectify and lower the impedance of said in-phase signal; means including at least two of said plurality of conductors for transmitting said in-phase signal to said surface equipment; servo recording means forming part of said surface equipment and including a servo motor and shaft, a differential amplifier responsive to differences between said in-phase signal and a generated reference signal to cause the shaft of said motor to rotate to convert said in-phase signal into an equivalent angular position of said shaft, the magnitude of said generated reference signal representing an instant angular position of said shaft selected by the wiper of a linear voltage divider driven by said shaft, said amplifier producing an output to drive said motor until said generated reference signal reduces the differential input to zero, and means cooperating with other linear potentiometers controlled by said shaft to record the resistivity and conductivity of the subsurface formations adjacent an instant position of said coil system; and means to calibrate said system and select a desired sensitivity including a subsurface switch operable to switch different resistive loads across the calibrate coils and to change the signal channel sensitivity; and position indicating means to match a surface selected switch position with the position of said subsurface switch corresponding thereto.

References Cited in the file of this patent

UNITED STATES PATENTS

| | | |
|---|---|---|
| 2,220,070 | Aiken | Nov. 5, 1940 |
| 2,451,021 | Detuno | Oct. 12, 1948 |
| 2,582,314 | Doll | Jan. 15, 1952 |
| 2,617,852 | Waters | Nov. 11, 1952 |
| 2,652,530 | Davidson | Sept. 15, 1953 |
| 2,714,309 | Redemske | Aug. 2, 1955 |
| 2,728,047 | Doll | Dec. 20, 1955 |
| 2,788,483 | Doll | Apr. 9, 1957 |
| 2,903,642 | Seigel | Sept. 8, 1959 |